United States Patent

Imahashi et al.

[11] Patent Number: 5,991,003
[45] Date of Patent: Nov. 23, 1999

[54] SYNCHRONOUS CONTROL APPARATUS

[75] Inventors: Kazuyasu Imahashi; Katsuichi Tachi; Norihiko Noguchi, all of Kanagawa, Japan

[73] Assignee: Sony Cinema Products Corporation, Culver City, Calif.

[21] Appl. No.: 09/018,941

[22] Filed: Feb. 5, 1998

Related U.S. Application Data

[63] Continuation of application No. PCT/JP97/02084, Jun. 17, 1997.

[30] Foreign Application Priority Data

Jun. 18, 1996 [JP] Japan .................................. 8-156799

[51] Int. Cl.$^6$ .................................................. G03B 31/00
[52] U.S. Cl. ............................... 352/12; 352/17; 352/25; 352/26; 352/27
[58] Field of Search ................................ 352/12, 17, 25, 352/26, 27

[56] References Cited

U.S. PATENT DOCUMENTS

| | | |
|---|---|---|
| 3,832,045 | 8/1974 | Wilson et al. ............................. 352/25 |
| 3,932,032 | 1/1976 | Weinstein .................................. 352/26 |
| 4,032,224 | 6/1977 | Wray ........................................ 352/26 |
| 4,307,946 | 12/1981 | Wray et al. .............................. 352/17 |

FOREIGN PATENT DOCUMENTS 7-230130  8/1995  Japan .

*Primary Examiner*—Russell Adams
*Attorney, Agent, or Firm*—Frommer Lawrence & Haug, LLP; William S. Frommer

[57] ABSTRACT

A synchronous control device having a memory 101 for storing block data blocked in terms of a pre-set data amount, a clock generating circuit 102 for generating input side clocks which are based on a data rate to be synchronized, and a memory control unit 103 for generating output side clocks $C_{out}$ responsive to input side clocks $C_{in}$ from the clock generating circuit 102. The memory 101 stores the block data on the block basis, based on the input side clocks $C_{in}$ from the clock generating circuit 103, and outputs the stored block data based on the output side clocks $C_{out}$ from the memory control circuit 103. The memory control circuit 103 detects a difference between the input data volume and the output side data volume in the memory 101 for varying the speed of the output side clocks responsive to the amount of the detected difference so that the output side clocks will be synchronized with the input side clocks $C_{in}$ from the clock generating circuit 103.

13 Claims, 5 Drawing Sheets

CONVENTIONAL OUTPUT
SIDE CLOCK SPEED

SYNCHRONOUS CONTROL APPARATUS

This is a continuation of copending International Application PCT\JP97\02084 having an international filing date of Jun. 17, 1997.

TECHNICAL FIELD

This invention relates to a synchronous controlling apparatus for performing control for synchronizing the speech to the image for outputting the synchronized speech and image in a projector in which the image signal output speed is not necessarily constant.

BACKGROUND ART

In a video tape recorder (VTR), for example, standard external synchronization signals are used and image signals are reproduced based on these external synchronization signals. That is, in a VTR, speech signals transiently stored in a memory are reproduced to follow up with clocks generated on the basis of external synchronization signals (reference clocks).

The input data volume and the output data volume to or from the memory occasionally undergo local deviation from the reference clocks. However, these data volumes are generally constant. Thus, in the above VTR, the writing clocks (input side clocks) and the readout clocks (output side clocks) are controlled at a pre-set velocity so that partial offset from the reference clocks is taken up by a time base corrector (TBC).

However, in a system devoid of the reference clocks, for example, in a projector, the image signal playback speed is determined by the film frame feed speed, such that there is no guarantee for an absolutely constant playback speed, with the playback speed being varied both locally and comprehensively. The speech signals need to be reproduced in synchronism with this playback speed of the image signals. However, with the conventional system, such as a projector, the output side clock rate is perpetually constant without regard to how much the input side clocks of the memory in which the speech signals are transiently stored, that is the clocks based on the playback speed of the image signals, deviates from the output side clocks. The result is that deviation is produced between the image and the speech and that, if the input side clocks are monotonously increased, the memory is occupied to its maximum capacity such that memory rupture occurs.

If, for preventing deviation between the image and the speech or evading the memory-full state, the memory input side clocks are compulsorily matched to the memory output side clocks by, for example, a phase-locked loop (PLL), the output side clocks react hypersensitively to local fluctuations of the input side clocks, thus outputting wow and flutter. If, for prohibiting the outputting of the wow and flutter, the reaction response speed of the output side clocks is delayed, prolonged time elapses until the output side clock reaction subsides to a steady state, thus again producing deviation between the image and the speech.

That is, with the conventional memory control, there are only two speeds at which the data is outputted from the memory (output speeds), that is a speed for a steady-state mode and a speed for an accelerated mode. The result is that the output side clocks follow up at a constant speed, for example, a speed added to with a speed increment s1, without regard to the extent of offset between the output side clocks and the input side clocks.

If the current output speed deviates significantly from the target speed, a prolonged time $t_d$ is required until the output speed catches up with the target speed $S_d$, as shown in FIG. 4 showing memory control contrasted to that in the synchronous control device of the present invention, as later explained, such that, during this time $t_d$, the speech remains deviated from the image.

Moreover, if the current output speed is slightly deviated from the target speed, the output speed reaches the target speed $S_d$ in a shorter time $t_d$ as shown in FIG. 5 showing memory control contrasted to that in the synchronous control device of the present invention as later explained, that is the output speed is changed abruptly, thus producing a non-spontaneous sound.

It is therefore an object of the present invention to provide a synchronous control device whereby the output side data rate can be reliably synchronized with the input side data rate.

It is another object of the present invention to provide a synchronous control device whereby the speech can be reliably synchronized with the image.

DISCLOSURE OF THE INVENTION

A synchronous control apparatus according to the present invention includes memory means for storing block data blocked in terms of a pre-set data amount, clock generating means for generating input side clocks which are based on a data rate to be synchronized, and control means for generating output side clocks responsive to input side clocks from the clock generating means. The memory means stores the block data on the block basis, based on the input side clocks from the clock generating means, and outputs the stored block data based on the output side clocks from the control means. The control means detects a difference between the input data volume and the output side data volume in the memory means for varying the speed of the output side clocks responsive to the amount of the detected difference.

In the synchronous control apparatus according to the present invention, the control means varies the speed of the output side clocks significantly and slightly if the difference is of a larger or a smaller value, respectively.

In the synchronous control apparatus according to the present invention, memory means stores the speech signals and the clock generating means generates input side clocks which are based on the image signal reproducing speed.

BEST MODE FOR CARRYING OUT THE INVENTION

Figure 1:
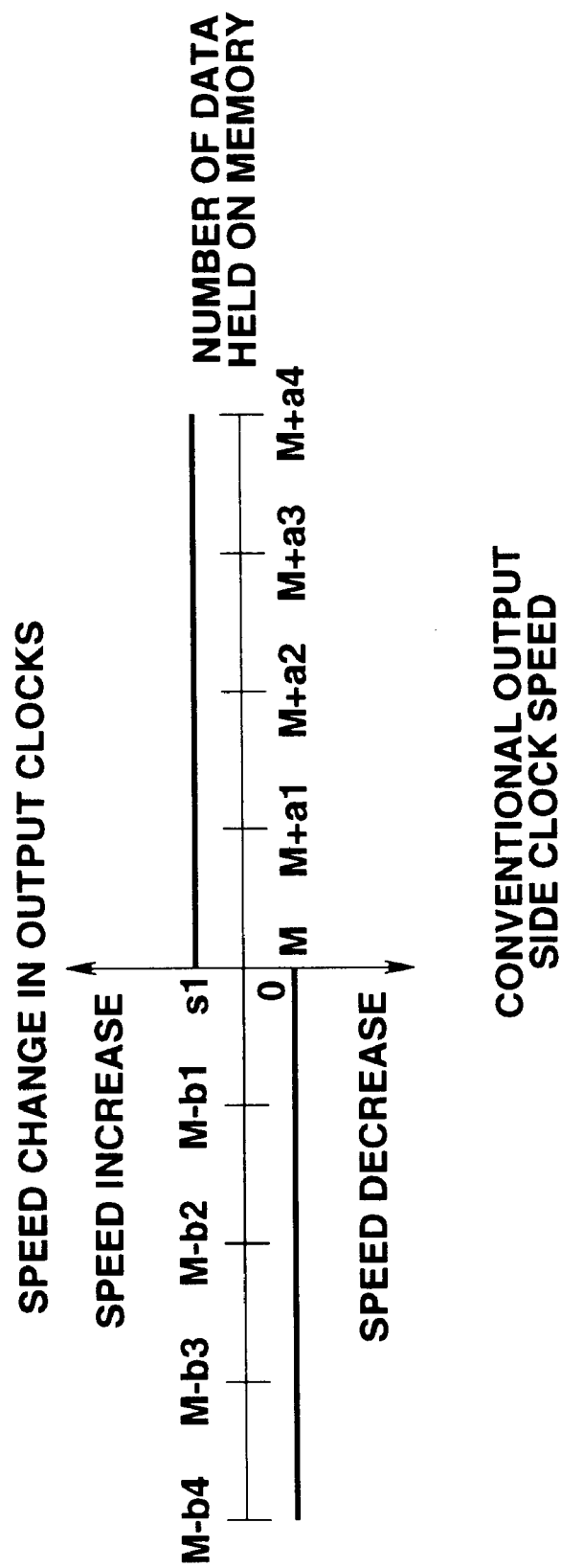
FIG. 1 illustrates conventional memory control.

Referring to the drawings, preferred embodiments for carrying out the present invention will be explained in detail.

Figure 2:
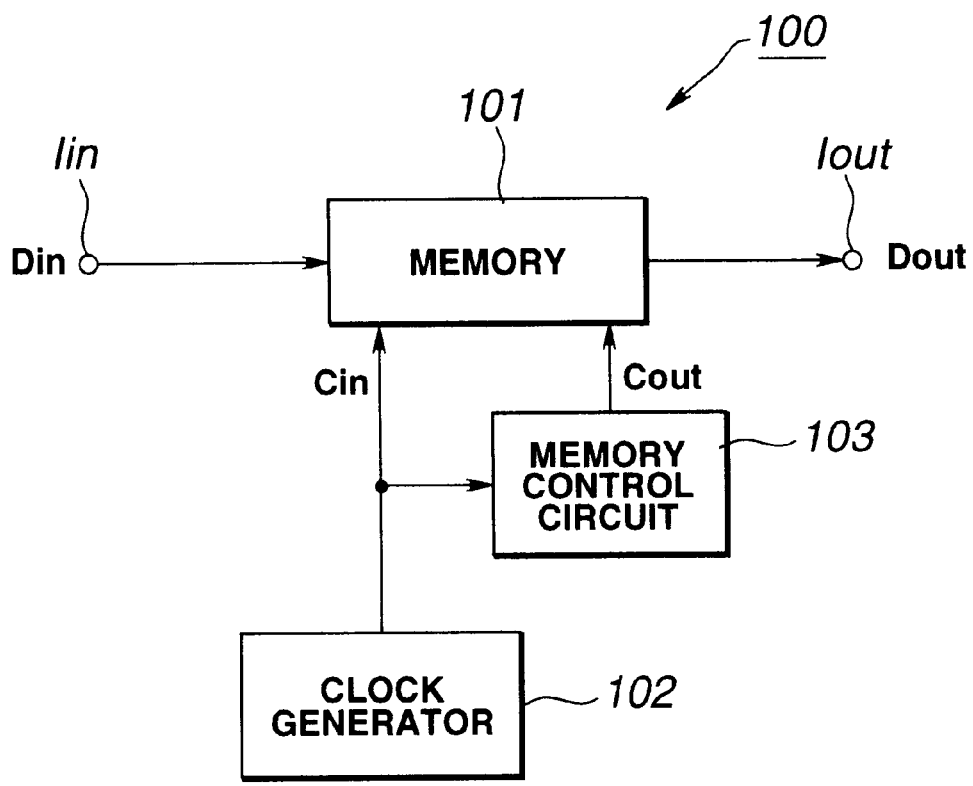
FIG. 2 is a block diagram showing the structure of a synchronous control device according to the present invention.

The synchronous control device according to the present invention is applied to a time base corrector (TBC) 100 configured as shown in FIG. 2.

The TBC 100 includes a memory 101, to which input data $D_{in}$ is entered via input terminal $I_{in}$ and from which output data $D_{out}$ is outputted via an output terminal $I_{out}$, a clock generator 102 for generating input side clocks $C_{in}$ and a memory control circuit 103 for generating output side clocks $C_{out}$. The clock generating circuit 102 generates the input side clocks $C_{in}$ for the memory 101 and for the memory control circuit 103 while the memory control circuit 103 generates the output side clocks $C_{out}$ for the memory 101.

The above-described TBC 100 is configured for synchronizing the speech with an image, for which constant-speed reproduction is not guaranteed, and outputs the resulting image and the signal.

The input data $D_{in}$, supplied via input terminal $I_{in}$ to the memory 101, is speech data per unit time, and is blocked in terms of a pre-set data amount.

The memory 101 is a first-in first-out (FIFO) memory, and can store up to a maximum of N data blocks. In the memory 101, the input data $D_{in}$ is stored on the block basis based on the input side clocks $C_{in}$. From this memory 101, the output data $D_{out}$ is outputted at a fixed interval based on the output side clocks $C_{out}$ as later explained.

Although not shown, the information concerning the playback speed of image signals is supplied to the clock generating circuit 102. This clock generating circuit 102 generates input side clocks $C_{in}$ for the memory 101 and for the memory control circuit 103, based on the information concerning the playback speed of the supplied image signals. Therefore, the memory 101 stores the input data $D_{in}$ based on the input side clocks $C_{in}$ from the clock generating circuit 102, as explained previously.

The memory control circuit 103 generates output side clocks $C_{out}$, corresponding to the input side clocks $C_{in}$ from the clock generating circuit 102, and generates the output side clocks $C_{out}$ to the memory 101, for designating data outputting in the memory 101. Therefore, when fed with the output side clocks $C_{out}$ from the memory control circuit 103, the memory 103 outputs one-block output data $D_{out}$ via output terminal $I_{out}$.

The above-described memory control circuit 103 is now explained specifically.

The memory control circuit 103 in the TBC 100 according to the present invention is configured for varying the interval of occurrence of the output side clocks $C_{out}$, that is the rate of the output side clocks $C_{out}$, responsive to the magnitude of the difference between an input data volume and an output data volume in the memory 101.

Specifically, the memory control circuit 103 detects the difference between the input side clocks $C_{in}$ from the clock generating circuit 102 and the output side clocks $C_{out}$ generated from the memory 101 for comprehending the number of blocks of the input data $D_{in}$ currently stored in the memory 101.

Supposing that M data blocks are stored in the memory 101, the memory control circuit 103 sets the data of the output side clocks $C_{out}$ to an optional speed S, and generates the output side clocks $C_{out}$ for the memory 101 at this speed S.

This speed S is an optimum speed for which the relation $$M=N/2$$

holds, where M is the number of the blocks stored in the memory 101, as described above, and N is the maximum number of blocks that can be stored in the memory 101, with the speed being coincident with the speed of the input side clocks $C_{in}$. This speed is also sometimes referred to hereinafter as a target speed.

Figure 3:
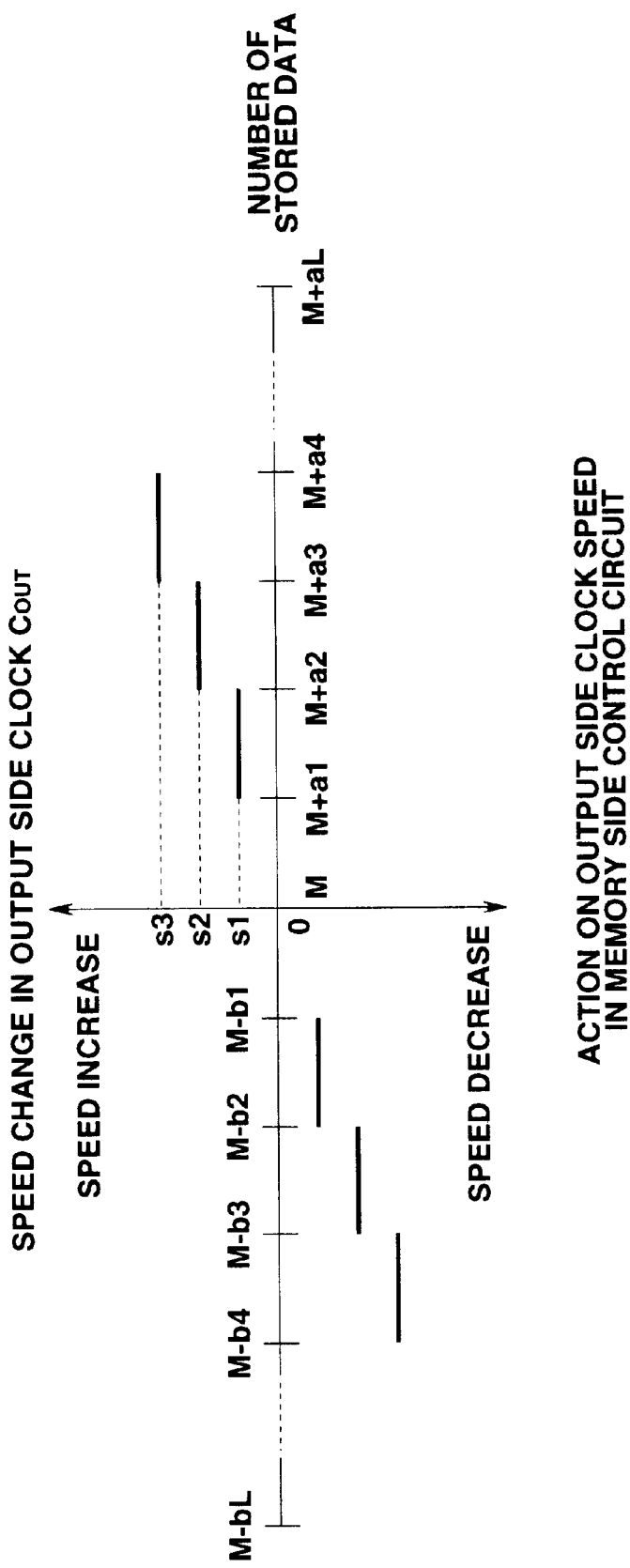
FIG. 3 illustrates memory control in the synchronous control device shown in FIG. 2.
Figure 4:
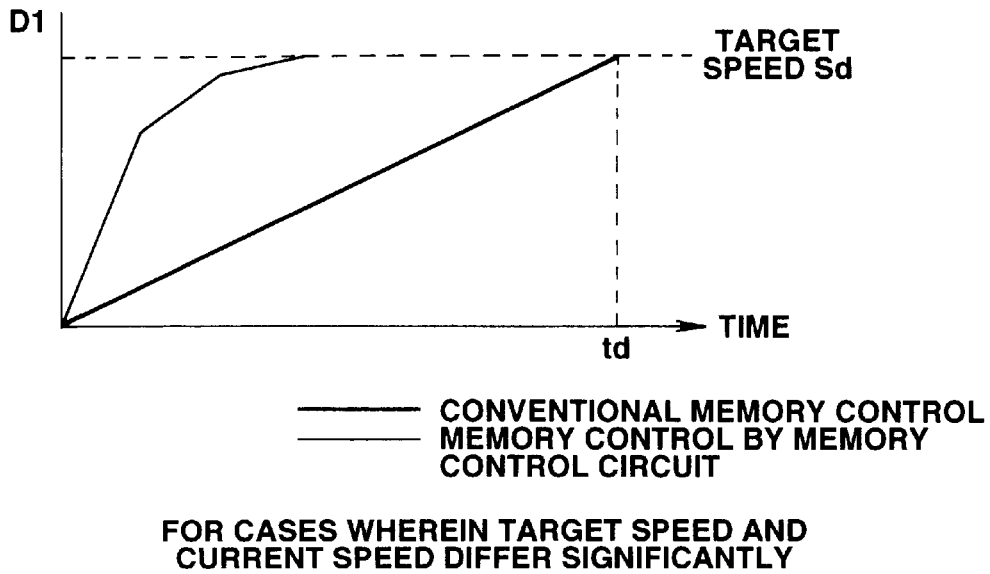
FIG. 4 illustrates memory control in the synchronous control device shown in FIG. 2 in a case in which the speech signal playback speed differs significantly from the target speed, as contrasted to a conventional memory control.

FIG. 3 shows the relation between the number of data blocks stored in the memory 101 and the speed of the output side clocks $C_{out}$ generated by the memory control circuit 103. The number of data blocks stored in the memory 101 is also sometimes referred to hereinafter as a target speed.

Referring to FIG. 3, the abscissa representing the number of stored data is divided into L segments, in each of which it is prescribed stepwise how much the speed of the output side clocks $C_{out}$ can be changed. If an optional point M on the abscissa, representing the number of stored data equal to M and the state of an optimum speed S, is taken as center point, the speed of the output side clocks $C_{out}$ is increased towards the right, that is towards a larger amount of stored data, while the speed of the output side clocks $C_{out}$ is decreased towards the left, that is towards a smaller amount of stored data.

Referring to FIG. 3, the speed manipulation for the output side clocks $C_{out}$ in the memory control circuit 103 is explained.

If, as a result of detecting the difference between the input side clocks $C_{in}$ and the output side clocks $C_{out}$, the amount of stored data is found to be M, the memory control circuit 103 generates the output side clocks $C_{out}$ for the memory 101 at the current speed S, without varying the speed of the output side clocks $C_{out}$, as long as the speed of the input side clocks $C_{in}$ remains constant. Thus, there perpetually exist M data blocks in the memory 101.

If the speed of the input side clocks $C_{in}$ is changed, and the number of blocks of the input data Din per unit time is increased, as a result of which the amount of stored data is increased, the memory control circuit 103 keeps the speed S of the output side clocks $C_{out}$ unchanged, as long as the number of the stored data in the memory 101 ranges from (M−b1) to (M+a1). When the amount of stored data exceeds a threshold value M+a1, the memory control circuit 103 sets the speed to S+s1 which corresponds to the speed S of the output side clocks $C_{out}$ increased by s1. In this manner, the changes the speed of the output side clocks $C_{out}$ responsive to the increased number of the stored data in order to render the speed of the output side clocks $C_{out}$ coincident with the speed of the input side clocks $C_{in}$.

If the amount of the stored data is again in a range from (M−b1) to (M+a1), the speed of the output side clocks $C_{out}$ is stabilized at the speed S+s1.

If the amount of stored data is not within the range from (M−b1) to (M+a1), despite the fact that the speed of the output side clocks $C_{out}$ is changed to the speed S+s1, the memory control circuit 103 again changes the speed of the output side clocks $C_{out}$.

That is, if the amount of stored data is not larger than (M+a2), the memory control circuit 103 again increases the speed S+s1 by s1 to set the speed of the output side clocks $C_{out}$ to S+s1+s1. If the amount of the stored data ranges between M+a2 and M+a3, the memory control circuit 103 increases the speed S+s1 by s2 so as to set the speed of the output side clocks $C_{out}$ to S+s1+s2. In this manner, the memory control circuit 103 repeatedly manipulates the speed of the output side clocks $C_{out}$ in order to arrive at an optimum speed of the output side clocks $C_{out}$.

Thus, the memory control circuit 103 acts on the speed of the output side clocks $C_{out}$ so that, if the current output speed in the memory 101 differs significantly from the target speed, the output speed is changed significantly at the outset and as from a time point the output speed approaches the target speed, the output speed is changed gradually to approach to the target speed. It is noted that, if, in the above-described conventional memory control, shown in FIG. 1, the current output speed is changed significantly from the target speed, prolonged time $t_d$ is required until the output speed reaches the target speed $S_d$, with the speech and the image being offset relative to each other during this time interval $t_d$. Conversely, with the memory control by the memory control circuit 103 in the TBC 100 according to the present invention, the output speed can be brought into coincidence with the target speed in a shorter time, thus preventing deviation between the image and the speech which might otherwise be produced if the image signal reproducing speed differs significantly from the speech signal reproducing speed.

Figure 5:
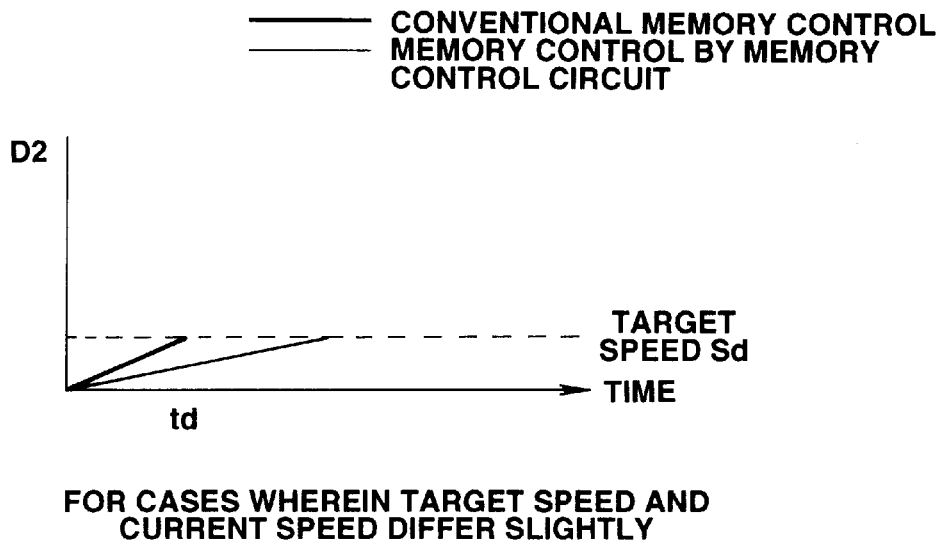
FIG. 5 illustrates memory control in the synchronous control device shown in FIG. 2 in a case in which the speech signal playback speed differs slightly from the target speed, as contrasted to a conventional memory control.

In addition, if the output speed differs slightly from the target speed, the memory control circuit 103 changes the output speed slowly until the output speed coincides with the target speed. In the conventional memory control, as described above with reference to FIG. 1, if the current output speed differs slightly from the target speed, the output speed reaches the target speed $S_d$ in a short time, such as during time $t_d$, as shown in FIG. 5, that is the output speed is changed abruptly, so that the output sound is non-spontaneous. Conversely, in the memory control circuit 103 in the TBC 100 employing the present invention, there is produced no non-spontaneous sound even if the playback speed differs slightly from that of the speech signal, thus enabling the image and the speech to coincide positively with each other.

Also, since the memory control circuit 103 monitors the number of data blocks stored in the memory 101, there is no risk of the speed of the output side clocks $C_{out}$ becoming stabilized in a state in which the image is offset from the speech, thus enabling the output side clocks $C_{out}$ to be produced at an optimum speed. Therefore, the image can be caused to coincide at all times with the speech.

Figure 6:
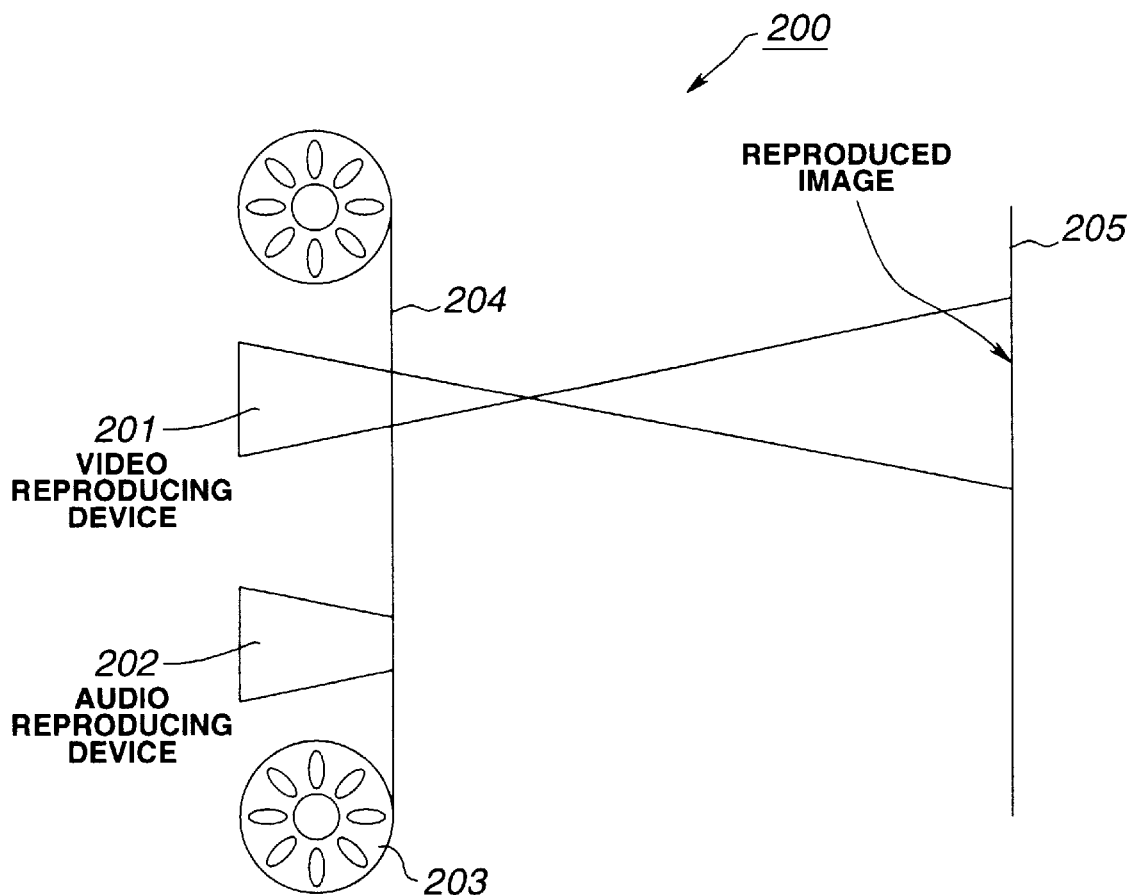
FIG. 6 is a block diagram showing the structure of a projector employing the synchronous control device according to the present invention.

The synchronous control device according to the present invention can be adapted to a projector 200 configured as shown for example in FIG. 6.

This projector 200 includes an image reproducing device 201 for reproducing image signals recorded on a motion picture film 204, a speech reproducing device 202 for reproducing the speech signals recorded on the motion picture film 204, a take-up unit 203 for feeding the motion picture film 204 frame-by-frame and a screen 205 on which to project an image reproduced by the image reproducing device 201.

Although not shown, the speech reproducing device 202 includes the TBC 100 shown in FIG. 2, and is adapted to be fed with the information concerning the image signal reproducing speed of the image reproducing device 201.

Referring to FIGS. 2 and 6, the projector 200 will be explained specifically.

First, the take-up unit 203 feeds the motion picture film 204 frame-by-frame at an optional speed. There is no guarantee for an absolutely constant frame feed speed, with the frame feed speed being varied both locally and comprehensively.

The image reproducing device 201 reproduces the image signals recorded on the motion picture film 204 so as to follow up with the frame feed speed by the take-up unit 203, and reproduces the image signals recorded on the motion picture film 204, for projecting the reproduced image signals on the screen 205.

At this time, the speech reproducing device 202 is fed with the information concerning the frame feed speed of the takeup unit 203, that is the information concerning the image signal playback speed in the image reproducing device 201. The playback speed information supplied to the speech reproducing device 202 is fed to the clock generating circuit 202 shown in FIG. 2. The clock generating circuit 102 generates clocks derived from the playback speed information as the input side clocks $C_{in}$.

Since the image reproducing device 201 follows up with the frame feed speed in the takeup unit 203 to reproduce the image signals recorded in the motion picture film 204, the image signal reproducing speed in the image reproducing device 201 also fluctuates. If small fluctuations in the playback speed of the image signals are integrated over time, there is produced deviation between the image and the speech. This indicates that an average value of the image signal playback speed has been changed. In such case, the speech reproducing device 202 performs time matching using the TBC shown in FIG. 2, while changing the playback speed itself of the speech signals.

That is, if the deviation between the image and the speech beyond a certain value is produced, the TBC 100 of the speech reproducing device 202 causes the speed of the output data $D_{out}$ (speech data) to be changed gradually so that the image signal playback speed will coincide with the speech signal playback speed. This outputs the speech reproduced at a speed coincident with the playback speed of the image signals from the speech reproducing device 202.

If the offset between the image and the speech continues to be increased, despite the fact that the output speed of the speech data is changed as described above, it indicates that the image signal reproducing speed is not as yet brought into coincidence with the speech signal reproducing speed. Thus, the TBC 100 causes the output speed of the speech data to be changed gradually until the image signal playback speed is coincident with the speech signal playback speed. Referring to FIG. 3, the larger the offset between the image and the signal, the more significantly the speech signal output speed is changed. Since the large offset between the image and the speech indicates the large difference between the image signal output speed and the speech signal output speed, the TBC 100 varies the output speed of the speech data significantly. Thus, the speech signal reproducing speed in the speech reproducing device 202 is changed significantly.

Since the projector 200 is designed so that the speech reproducing device 202 has the TBC 100 shown in FIG. 2, the output speech from the speech reproducing device 202 can be positively brought into coincidence with the image projected on the screen 205.

It will be seen from above that, with the synchronous control device according to the present invention, the memory means stores the block data, blocked in terms of a pre-set data amount, on the block basis, based in the input side clocks from the clock generating means, while outputting the block data stored based on the output side clocks from control means on the block basis. The clock generating means generates input side clocks which are based on the data rate to be synchronized. The control means detects the difference between the input data volume and the output data volume in the memory means, and varies the speed of the output side clocks responsive to the detected difference volume into synchronization with the input side clocks from the clock generating means, for generating the output side clocks. This reliably synchronizes the output data rate in the memory means to the data rate to be synchronized, even when the data rate to be synchronized is not a constant data rate.

Also, in the synchronous control device according to the present invention, the control means performs control so that, if the difference is of a larger value or of a small value, the output side clock speed is significantly or slightly changed, respectively, such that, if the data rate to be synchronized is deviated significantly from the output data rate in the memory means, the output data rate in the memory means can be promptly and reliably synchronized with the data rate to be synchronized. Moreover, if the data to be synchronized is slightly offset from the output data rate in the memory means, the output data rate in the memory means can be naturally and reliably synchronized with the data rate to be synchronized.

Moreover, in the synchronous control device according to the present invention, by storing speech signals in the memory means, and by generating, by the clock generating means, the input side clocks which are based on the reproducing speed of the image signals, the speech signal reproducing speed can be reliably synchronized with the image signal reproducing speed.

We claim:

1. A synchronous control apparatus comprising:

memory means for storing block data blocked in terms of a pre-set data amount, clock generating means for generating an input side clock which is based on a data rate to be synchronized, and control means for generating an output side clock responsive to the input side clock from said clock generating means; wherein said memory means stores the block data on a block by block basis, based on the input side clock from said clock generating means, and outputs the stored block data based on the output side clock from said control means; and wherein said control means detects a difference between the input data volume and the output side data volume in said memory means for varying the speed of the output side clock responsive to the amount of the detected difference.

2. The synchronous control apparatus as claimed in claim 1 wherein said control means varies the speed of the output side clock significantly and slightly if the difference is of a larger or a smaller value, respectively.

3. The synchronous control apparatus as claimed in claim 1 wherein said memory means stores speech signals and wherein said clock generating means generates the input side clock which is based on an image signal reproducing speed.

4. The synchronous control apparatus as claimed in claim 3, wherein said image signal reproducing speed is variable, and said input side clock thereby having a variable speed.

5. A synchronous control apparatus comprising:

memory means for storing block data blocked in terms of a pre-set data amount, clock generating means for generating an input side clock which is based on a data rate to be synchronized, and control means for generating an output side clock responsive to the input side clock from said clock generating means; wherein said memory means stores the block data on a block by block basis, based on the input side clock from said clock generating means, and outputs the stored block data based on the output side clock from said control means; and wherein said control means detects an amount of data currently stored in the memory means, and varies the speed of the output side clock responsive to the detected amount of currently stored data, the output side clock speed variation being correlated with a detected deviation from a predetermined amount of stored data.

6. The synchronous control apparatus as claimed in claim 5, wherein said predetermined amount of stored data is an amount of data storable in one half of said memory means.

7. The synchronous control apparatus as claimed in claim 5 wherein said control means varies the speed of the output side clock significantly and slightly if the detected deviation is of a larger or a smaller value, respectively.

8. The synchronous control apparatus as claimed in claim 5 wherein said memory means stores speech signals and wherein said clock generating means generates the input side clock which is based on an image signal reproducing speed.

9. The synchronous control apparatus as claimed in claim 8, wherein said image signal reproducing speed is variable, and said input side clock thereby having a variable speed.

10. A synchronous control apparatus comprising:

a memory for temporarily storing block data;

a clock generator operable to generate an input side clock having a variable speed controlling a rate at which data is input to said memory, said variable speed being synchronized with a reproduction rate associated with reproduction of other information; and a memory controller operable to detect an amount of data currently stored within said memory, and to generate an output side clock having a speed controlling a rate of data retrieved from said memory;

wherein said output side clock speed is varied based on the detected amount of currently stored data, and is correlated with a detected deviation from a predetermined amount of stored data.

11. The synchronous control apparatus as claimed in claim 10, wherein said predetermined amount of stored data is an amount of data storable in one half of said memory.

12. The synchronous control apparatus as claimed in claim 10 wherein said memory controller varies the speed of the output side clock significantly and slightly if the detected deviation is of a larger or a smaller value, respectively.

13. The synchronous control apparatus as claimed in claim 10 wherein said memory stores speech signals and wherein said reproduction rate associated with reproduction of other information is a variable reproduction rate for an image signal associated with said speech signals.

\* \* \* \* \*